Figure 1:
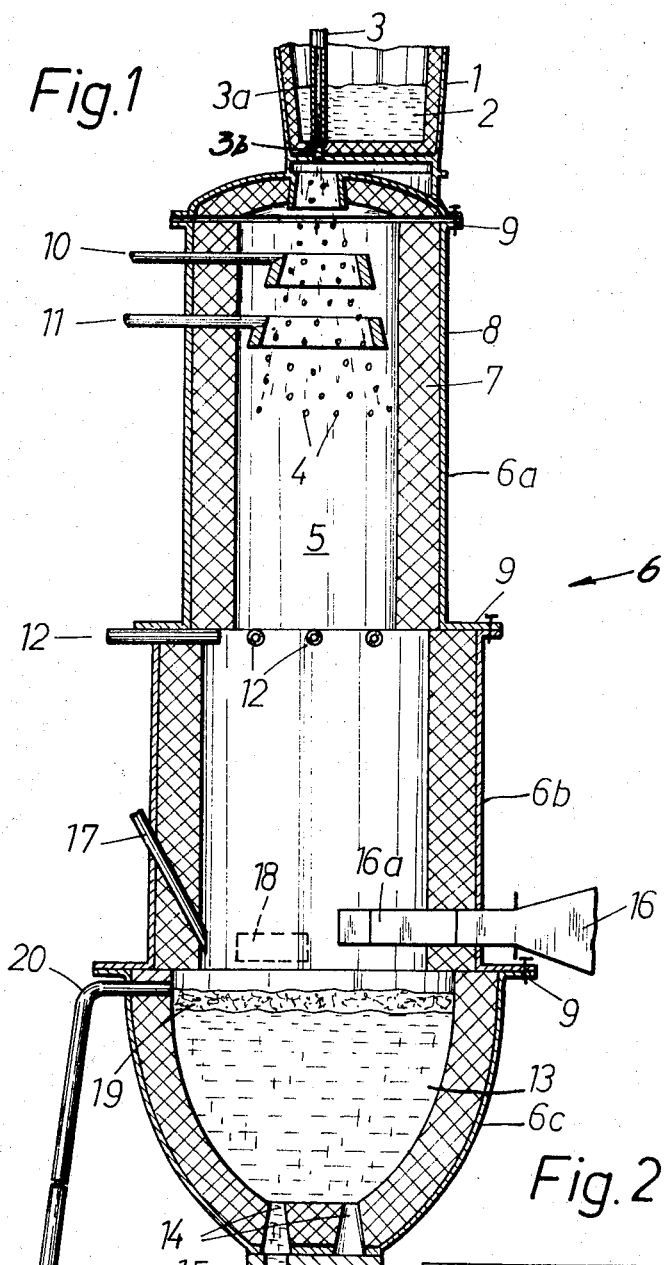

United States Patent

[11] 3,591,159

[72] Inventors: Theodor Messing, Mulheim (Ruhr); Werner Coupette, Wattenscheid-Eppendorf, both of, Germany
[21] Appl. No.: 737,196
[22] Filed: June 14, 1968
[45] Patented: July 6, 1971
[73] Assignee: Standard-Messo Duisburg Gesellschaft fur Chemietechnik mit beschrankter Haftung & Co., Duisburg, Germany
[32] Priority: June 19, 1967
[33] Germany
[31] P 15 33 949.8

[54] APPARATUS FOR PRODUCING STEEL FROM PIG IRON IN CONTINUOUS PROCESS
8 Claims, 2 Drawing Figs.

[52] U.S. Cl. .................................................. 266/34, 76/60
[51] Int. Cl. ............................................................. C21c 7/10
[50] Field of Search ...................................... 266/34, 34 V, 34 T, 34.1; 75/60, 49

[56] References Cited

UNITED STATES PATENTS

| 2,997,386 | 8/1961 | Feichtinger | 266/34 |
| 3,146,288 | 8/1964 | Gero | 266/34 |
| 3,356,489 | 12/1967 | Feichtinger | 266/34 X |

FOREIGN PATENTS

| 949,610 | 2/1964 | Great Britain | 75/60 |

*Primary Examiner*—Donald R. Schran
*Attorneys*—Walter Becker

ABSTRACT: A method of and apparatus for the continuous production of steel from pig iron according to which in a continuous operation pig iron is introduced into evacuated gas extraction chamber means divided up into fine droplets which latter are subjected to the action of oxygen.

PATENTED JUL 6 1971 3,591,159

INVENTORS:
Theodor Messing
Werner Coupette
BY
Walter Becky

APPARATUS FOR PRODUCING STEEL FROM PIG IRON IN CONTINUOUS PROCESS

The present invention relates to a process and an apparatus for the continuous production of steel from pig iron. In the conversion of pig iron to steel under normal pressure, it is standing practice to promote and accelerate the processes of oxidation by the use of pure oxygen. Another familiar practice is to spray the molten iron in droplet form, thereby creating a large surface area, to make the action of the oxygen still more effective.

The invention aims at producing steel from pig iron by a continuous process, "continuous" here meaning that the pig iron is no longer treated in batches, but taken from a supply ladle, into which the charges can be run. Another purpose of the invention is to provide a process such that even small amounts of the molten steel produced can be tapped off continuously. The invention also seeks to eliminate the drawbacks arising in the present state of the art.

Taking as its starting-point the existing methods of producing steel continuously from pig iron, the invention achieves its purpose by virtue of the fact that the iron is poured in a stream into an evacuated gas extraction chamber, broken up into fine droplets and then treated with oxygen. Before and during this oxygen treatment in the gas extraction chamber, materials capable of promoting the reaction, such as boron, barium, niobium and steam, may be added to the iron. It is also possible to add finely divided iron ore to the pig iron while this is being treated with oxygen in the gas extraction chamber, to control the oxidation and/or the temperature. During and after the treatment with oxygen, one may also add to the iron in the gas extraction chamber substances which can release the phosphorus and sulfur, such as cerium or calcium.

The characteristic feature in the conversion of iron into steel is the reduction of the carbon content in the iron, this reduction in carbon taking place with the evolution of carbon monoxide gas. Now, at a temperature of 1,500° C., and a pressure of one atmosphere, the free energy of formation of carbon monoxide (from one initial molecule of oxygen) amounts to 130 kcal., but when the pressure is reduced, this energy of formation is greatly increased, amounting to some 170 kcal. at a pressure of 1 Torr. The invention is furthermore based on the finding that the free energy of formation of the combination of oxygen with iron and the other elements accompanying iron is hardly, if at all, affected by a drop in pressure. This in turn means that, when oxygen is used at reduced pressure, the undesirable scorification of iron and the other elements accompanying iron is greatly reduced, for the same carbon separation.

Steel produced by the method according to the invention possesses the properties of the greatly prized vacuum steel. One great advantage of the process is that this vacuum steel is produced continuously and is particularly suitable for casting in continuous-casting foundries. At the same time, the amount of continuously produced vacuum steel can be kept small enough for the continuous-casting foundry not to need to possess more than one casting unit. In this way, the capital investment in such continuous-casting installations is considerably reduced. Moreover, the vacuum steel is produced only in quantities such that the rolling-mill furnaces and mill trains that follow can also work continuously on the castings.

Another material advantage of the process according to the invention is that the well-known "brown smoke" that fouls the air so undesirably is now hardly present at all. In processes used hitherto, this brown smoke, which arises when pig iron is treated with pure oxygen, has had to be removed from the waste gases in costly filtration equipment. With the process according to the invention, however, the after burning of the vaporized metal particles in air, which gives rise to most of the brown smoke, is no longer possible. The relatively small amount of brown smoke still produced during the process according to the invention is necessarily precipitated in the condensers of the injectors used in producing the vacuum. A further advantage, finally, is that the carbon monoxide component of the gas extracted is not burnt and can be used as an energy carrier, for instance, in the generation of steam for the injector in the exhausting equipment.

The quantity of gas to be extracted in the process now proposed, when pig iron is being converted at the rate of 1 ton per minute, the pressure being between 10 Torrs and 1 Torr, lies within the scope of the general run of injectors with an intake capacity of about 5,000 kg./hr., so that there cannot be the slightest difficulty in maintaining the requisite degree of vacuum in the gas extraction chamber.

Figure 2:
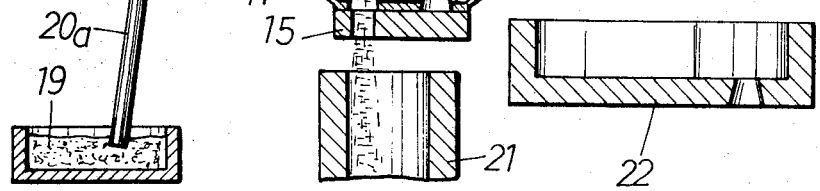

Further details, features and advantages of the objects of the invention will become apparent from the following specification in connection with the accompanying drawings showing one advantageous form of equipment for carrying out the process according to the invention and, more specifically, FIG. 1 is a longitudinal section of a gas extraction chamber with supply ladle and crucible, and FIG. 2 is a cross section of a runner, for insertion between the crucible and a continuous casting mold.

Charges of pig iron 2 can be run into a supply ladle 1 in readiness for use. The iron 2 may have come from a blast furnace or, where large quantities of scrap are being used, wholly or partially from a cupola. The supply ladle 1 always contains a certain amount of the crude iron 2. As with the normal production of steel from pig iron, so too according to the process of the invention, the composition of the crude iron should be chosen according to the desired steel analysis in conjunction with metallurgical factors such as the nature of the slag-forming materials and the substances used for phosphorus and sulfur elimination.

The pig iron 2 flows out of the supply ladle 1 through ordinary refractory brick, under the control of the stopper lifter 3. This stopper lifter may be cooled internally with an inert gas, such as argon or nitrogen, through a duct 3a. As it is blown in, the inert gas also promotes the spraying of the iron 2 in fine droplets 4 because the stream of iron 2 generally divides into droplets 4 less than would be the case with steel. The inert gas emerges from the duct 3a at the bottom of the stopper lifter 3 directly above the taphole 3b. It is possible, of course, for small quantities of substances capable of promoting reaction, such as boron, barium, niobium or steam, to be added to the inert gas. If the refractory brick in the stopper is not overstressed at the exit from the duct 3a, air may also be used inasmuch as the oxygen contained in the air itself exerts a decarburizing action.

From the supply ladle 1, the iron 2 is led into an evacuated gas extraction chamber 6 divided into two levels 6a and 6b and a crucible 6c the refined metal. The downward-opening end of the lower level 6b is closed by the crucible 6c. The two levels 6a and 6b are cylindrical or substantially cylindrical in cross section and are lined with refractory material 7 inside an iron casing 8. This casing 8 has flanges 9 at the top and bottom thereof to form pressuretight seals between the supply ladle 1, the levels 6a and 6b and the crucible 6c. The division of the gas extraction chamber 6 into levels 6a and 6b and crucible 6c has the advantage of enabling individual parts to be replaced when the refractory material 7 is to be replaced.

The inside diameter of the levels 6a and 6b and the crucible 6c advantageously increases in steps from top to bottom, so that the iron deposited on the interior wall may drip clear as it runs down.

As soon as the crude iron 2 enters the upper level 6a of the gas extraction chamber 2, oxygen plays upon it from a nozzle 10. The oxygen is introduced in gentle or more powerful jets, according to the subdivision that has already taken place into droplets 4 and which depends on the gas content of the iron and the amount of inert gas admitted by the stopper lifter 3, in conjunction with the degree of vacuum 5. The droplets 4 should be played upon by the oxygen over as great a distance as possible.

Below the nozzle 10, the upper level 6a of the gas extraction chamber 6 should also be provided with an intake pipe 11 through which finely divided granular iron ore can be admitted. This admixture of ore is optional and serves mainly for regulating the temperature in the gas extraction chamber. It is also possible, however, by admitting ore in this way, to control the oxidizing reaction. The direct conversion of ore into steel, thus made possible, relieves the load on the blast furnace or cupola.

The division of the gas extraction chamber 6 into the levels 6a and 6b and the crucible 6c, in conjunction with the stepped increase in inside diameter, gives rise to the formation of annular spaces 9, which can be turned to account in carrying out further metallurgical measures. Thus, for instance, it becomes possible for substances capable of releasing phosphorus and sulfur, such as cerium and/or calcium, to be admitted to the level 6b through feed pipes 12, distributed all round the periphery at the junction with the level 6a. Here it should be borne in mind that the free oxygen concentration is being reduced continuously from top to bottom. Reactions such as phosphorus elimination, which prefers oxidizing conditions, can, therefore, be carried out more readily near the top, whereas the sulfur elimination is better carried out in the lower part.

The molten steel 13 is caught in the crucible 6c. The bottom of this crucible 6c is provided with several tapholes 14, which can be closed and opened with the aid of a slide 15, for example. For the molten steel 13 to be run out, the bath in the crucible 6c must have reached a level such that its ferrostatic pressure at the exit is greater than the difference between atmospheric pressure and the degree of vacuum 5 in the gas extraction chamber 6. An extraction pipe 16, associated with conventional exhausting equipment (not shown) is connected to the base of the lower level 6b of the chamber 6. This extraction pipe 16 opens into the gas extraction chamber 6 by way of a semicircular ring 16a.

At the opposite side of the chamber 6 to the extraction pipe 16, operations concerning with steel-making technique can be carried out. Thus, for instance, a test pipe 17, through which samples of steel for analysis can be withdrawn from the lower bath, can be fitted in the base of the level 6b. Another possibility is to fit an observation window 18 in that vicinity.

Within the crucible 6c there is generally slag 19 floating on the molten steel 13. This slag 19 is highly reactive, since, because of the gas given off by reason of the vacuum 5, it is very voluminous and the finely divided droplets 4, as they fall slowly, are able to react over a large surface area. The slag 19 can be drawn off through an overflow pipe 20 fitted at the rim of the crucible 6c. A discharge pipe 20a is connected to the overflow pipe 20, the weight of the outflowing column of slag having to be greater than the counteracting force exerted by the vacuum 5. It has been found advantageous to heat this discharge pipe 20a to keep the slag 19 in a fluid state. A flux may also be added to the slag 19 for the same purpose.

The tapholes 14 in the bottom of the crucible 6c are exposed to severe heat stresses. For that reason, several such holes 14 are provided so that one can be opened, e.g., by means of slides 15, whenever another one has worn out. The speed at which the molten steel 13 is poured from the crucible 6c can be regulated by electroinductive devices (not shown), which can be incorporated in the pouring bricks.

An ordinary mold 21 can be charged directly from the taphole 14. It is also possible, however, to interpose a runner 22, shown in FIG. 2, between the taphole 14 and the mold 21. In that case, of course, it will be necessary to extend the tapholes 14 with a pouring connection, the bottom end of which extends into the molten steel in the runner 22. Samples can readily be taken from the runner 22 for carrying out test analyses, the results of which can be evaluated for the purpose of controlling the process.

A continuous-casting mold can naturally take the place of the ordinary mold 21 at the delivery end of the gas extraction chamber 6.

It is, of course, to be understood that the invention is not limited to the specific structure shown and method described but that the invention is defined by the scope of the claims.

What we claim is:

1. An apparatus for the continuous production of steel from pig iron, which includes: gas extraction chamber means including exhausting means for evacuation thereof and comprising a plurality of reaction levels ranging from lowermost to uppermost reaction level means to be passed through successively by pig iron to be refined, nozzle means arranged in the area of the uppermost level means of said gas extraction chamber means for conveying oxygen into said gas extraction chamber means, extraction pipe means arranged at the lowermost portion of the lowermost reaction level means of said gas extraction chamber means for connection with exhausting means, and crucible means arranged adjacent and subsequent to the last one of said levels when considering the direction of flow of pig iron through said levels for receiving pig iron refined in said multilevel extraction chamber means.

2. An apparatus according to claim 5, in which said extraction chamber means comprises a plurality of tubular sections connected to each other in a pressuretight manner and respectively forming said reaction levels, said tubular member increasing in diameter from level to level in the direction toward said crucible means.

3. An apparatus according to claim 2, in which said tubular sections are detachably connected to each other and to said crucible means.

4. An apparatus according to claim 5, which includes: supply ladle means arranged on and closing the top of said extraction chamber means, said supply ladle means being adapted to receive liquid pig iron and to release the same to said extraction chamber means.

5. An apparatus according to claim 5, in which the bottom portion of said crucible means is provided with tapholes adapted selectively to be opened and closed.

6. An apparatus according to claim 5, which includes: means arranged adjacent the area where said reaction levels meet for admitting additive substances to and taking samples from said gas extraction chamber means and said crucible means.

7. An apparatus according to claim 1, which includes; overflow pipe means arranged at the top portion of said crucible means for discharging slag from said crucible means.

8. An apparatus according to claim 1, which includes: continuous single strand casting installation means arranged near the bottom of said crucible means for receiving a continuous flow of molten steel therefrom.